United States Patent
Aslam et al.

(10) Patent No.: US 8,538,018 B2
(45) Date of Patent: Sep. 17, 2013

(54) METHODS AND APPARATUS FOR MIXING ENCRYPTED DATA WITH UNENCRYPTED DATA

(75) Inventors: Adeel A. Aslam, Davis, CA (US); Alberto J. Martinez, El Dorado Hills, CA (US); Ernie F. Brickell, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/342,288

(22) Filed: Jan. 3, 2012

(65) Prior Publication Data

US 2012/0106736 A1    May 3, 2012

Related U.S. Application Data

(63) Continuation of application No. 10/745,424, filed on Dec. 22, 2003, now Pat. No. 8,098,817.

(51) Int. Cl.
*H04N 7/167* (2011.01)

(52) U.S. Cl.
USPC .......................... 380/237; 380/236; 380/201

(58) Field of Classification Search
USPC ......... 380/200–202, 37, 42, 28, 29, 236–239; 713/193, 194; 726/26–33; 705/50–52, 57–59
See application file for complete search history.

(56) References Cited

U.S. PATENT DOCUMENTS

| | | |
|---|---|---|
| 4,591,660 A | 5/1986 | Scordo |
| 4,845,749 A | 7/1989 | Brickell et al. |
| 4,920,565 A | 4/1990 | Strawczynski et al. |
| 5,040,138 A | 8/1991 | Maher, III |
| 5,548,648 A | 8/1996 | Yorke-Smith |
| 5,751,617 A | 5/1998 | Wong |
| 5,768,126 A | 6/1998 | Frederick |
| 5,906,880 A | 5/1999 | Chiba et al. |
| 5,986,588 A | 11/1999 | Kim |
| 5,995,623 A | 11/1999 | Kawano et al. |
| 6,236,727 B1 | 5/2001 | Ciacelli et al. |
| 6,408,076 B1 | 6/2002 | Bewick |
| 6,690,307 B2 | 2/2004 | Karczewicz |
| 6,813,355 B1 | 11/2004 | Hakaste |
| 6,865,747 B1 | 3/2005 | Mercier |
| 6,931,551 B2 | 8/2005 | Weng et al. |
| 7,023,991 B1 | 4/2006 | Nakamura et al. |
| 7,027,982 B2 | 4/2006 | Chen et al. |

(Continued)

OTHER PUBLICATIONS

Nuggehally, Jayant S., "Digital Coding of Speech Waveforms: PCM, DPCM, and DM Quantizers," IEEE, Bell Laboratories, Jan. 28, 1974, 23 pages.

(Continued)

*Primary Examiner* — Nirav B Patel
(74) *Attorney, Agent, or Firm* — Hanley, Flight & Zimmerman, LLC.

(57) ABSTRACT

Methods and apparatus for mixing encrypted data with unencrypted data are disclosed. A disclosed system receives data from a first media source, such as DVD-Audio content, and encrypts the data from the first media source using a key stream to form an encrypted data stream. The disclosed system may separate the encrypted data stream into a plurality of encrypted data streams and may combine the plurality of encrypted data streams with an unencrypted data stream associated with a second media source to form a mixed data stream. The mixed data stream is formed without decrypting the plurality of encrypted data streams and is transmitted to hardware or a hardware driver.

17 Claims, 6 Drawing Sheets

(56) References Cited

U.S. PATENT DOCUMENTS

| | | | |
|---|---|---|---|
| 7,151,831 | B2 | 12/2006 | Candelore et al. |
| 7,191,342 | B1 | 3/2007 | New et al. |
| 7,194,192 | B2 | 3/2007 | Ko et al. |
| 7,197,768 | B2 | 3/2007 | Cole et al. |
| 7,242,773 | B2 | 7/2007 | Candelore |
| 7,280,956 | B2 | 10/2007 | Cross et al. |
| 7,286,667 | B1 | 10/2007 | Ryal |
| 7,751,556 | B2 | 7/2010 | Sato et al. |
| 8,098,817 | B2 | 1/2012 | Aslam et al. |
| 2002/0023120 | A1 | 2/2002 | Gentric |
| 2002/0044655 | A1 | 4/2002 | Applebaum |
| 2002/0049580 | A1 | 4/2002 | Kutaragi et al. |
| 2002/0053030 | A1 | 5/2002 | Weng et al. |
| 2002/0108049 | A1 | 8/2002 | Xu et al. |
| 2002/0121999 | A1 | 9/2002 | Akune et al. |
| 2002/0164017 | A1 | 11/2002 | Wee et al. |
| 2002/0164018 | A1 | 11/2002 | Wee et al. |
| 2002/0164153 | A1 | 11/2002 | Tanaka et al. |
| 2003/0190054 | A1 | 10/2003 | Troyansky et al. |
| 2004/0028227 | A1 | 2/2004 | Yu |
| 2004/0049688 | A1 | 3/2004 | Candelore et al. |
| 2004/0073917 | A1 | 4/2004 | Pedlow, Jr. et al. |
| 2005/0094808 | A1 | 5/2005 | Pedlow, Jr. et al. |
| 2005/0135618 | A1 | 6/2005 | Aslam et al. |
| 2005/0141713 | A1 | 6/2005 | Genevois |
| 2005/0259813 | A1 | 11/2005 | Wasilewski et al. |

OTHER PUBLICATIONS

Brickell et al., "Secure Audio Teleconference," Advances in Cryptology, Proceedings of Crypto 87, Bell Communications Research, 1987, 10 pages.

Infomosaic, "The Easy to Use Digital Signature," © 2000-2004, retrieved from http://www.infomosaic.net/encryption.htm on Jul. 4, 2004, 3 pages.

United States Patent and Trademark Office, "Notice of Allowance," issued in connection with U.S. Appl. No. 10/745,424, mailed Sep. 15, 2011, 42 pages.

United States Patent and Trademark Office, "Final Office Action," issued in connection with U.S. Appl. No. 10/745,424, mailed May 26, 2011, 13 pages.

United States Patent and Trademark Office, "Non-Final Office Action," issued in connection with U.S. Appl. No. 10/745,424, mailed Dec. 22, 2010, 13 pages.

United States Patent and Trademark Office, "Non-Final Office Action," issued in connection with U.S. Appl. No. 10/745,424, mailed Aug. 4, 2010, 30 pages.

United States Patent and Trademark Office, "Final Office Action," issued in connection with U.S. Appl. No. 10/745,424, mailed Dec. 28, 2009, 29 pages.

United States Patent and Trademark Office, "Non-Final Office Action," issued in connection with U.S. Appl. No. 10/745,424, mailed May 11, 2009, 37 pages.

United States Patent and Trademark Office, "Final Office Action," issued in connection with U.S. Appl. No. 10/745,424, mailed Oct. 28, 2008, 16 pages.

United States Patent and Trademark Office, "Non-Final Office Action," issued in connection with U.S. Appl. No. 10/745,424, mailed Apr. 7, 2008, 20 pages.

United States Patent and Trademark Office, "Non-Final Office Action," issued in connection with U.S. Appl. No. 10/745,424, mailed Jun. 25, 2007, 15 pages.

United States Patent and Trademark Office, "Non-Final Office Action," issued in connection with U.S. Appl. No. 10/745,424, mailed Nov. 20, 2006, 40 pages.

METHODS AND APPARATUS FOR MIXING ENCRYPTED DATA WITH UNENCRYPTED DATA

This patent arises from a continuation of U.S. application Ser. No. 10/745,424 filed Dec. 22, 2003 (now U.S. Pat. No. 8,098,817), entitled METHODS AND APPARATUS FOR MIXING ENCRYPTED DATA WITH UNENCRYPTED DATA, and which is hereby incorporated herein by reference in its entirety.

TECHNICAL FIELD

The present disclosure pertains to mixing digital data and, more particularly, to methods and apparatus for mixing encrypted data with unencrypted data.

BACKGROUND

The importance of digital audio content protection has increased significantly in recent years, particularly in the personal computing domain. For example, distributors of audio compact discs (CDs), artists creating the audio content, and software companies are concerned about the unauthorized copying of copyrighted digital audio content. Personal computer users wishing to capture and distribute copyrighted digital audio content can use a software application to capture raw digital audio data as it travels through the audio layers of an operating system to the hardware associated with the playback of the audio content.

One known method of preventing the copying of the copyrighted digital audio content encrypts a stream of digital audio data (i.e., an audio stream) at the source (e.g., an audio player application such as Windows Media Player™) and decrypts the audio stream at the destination (e.g., the hardware used to playback the audio and/or a software driver). This method is suitable if the encrypted audio content is not manipulated or mixed with any other audio source(s) as it travels from the source to the destination. However, if another sound (e.g., a system sound or any other unencrypted media source) is played back simultaneously, the operating system audio mixer will attempt to mix the encrypted audio stream with the unencrypted audio stream, rendering the resulting audio stream unintelligible at the destination.

Another known method of preventing copying of digital audio content encrypts the audio content at the source and decrypts the audio content at the operating system audio mixer before mixing in the second audio source. This method requires a significant amount of computational power because the audio content must be decrypted before any processing is performed on the encrypted audio content and, as a result, may cause noticeable delays in audio playback. Also, this method is not secure because each software component in the operating system audio layer is required to be aware of the encryption and the encryption key.

DETAILED DESCRIPTION

Although the following discloses example systems, including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the following describes example systems, persons of ordinary skill in the art will readily appreciate that the examples are not the only way to implement such systems.

Figure 1:
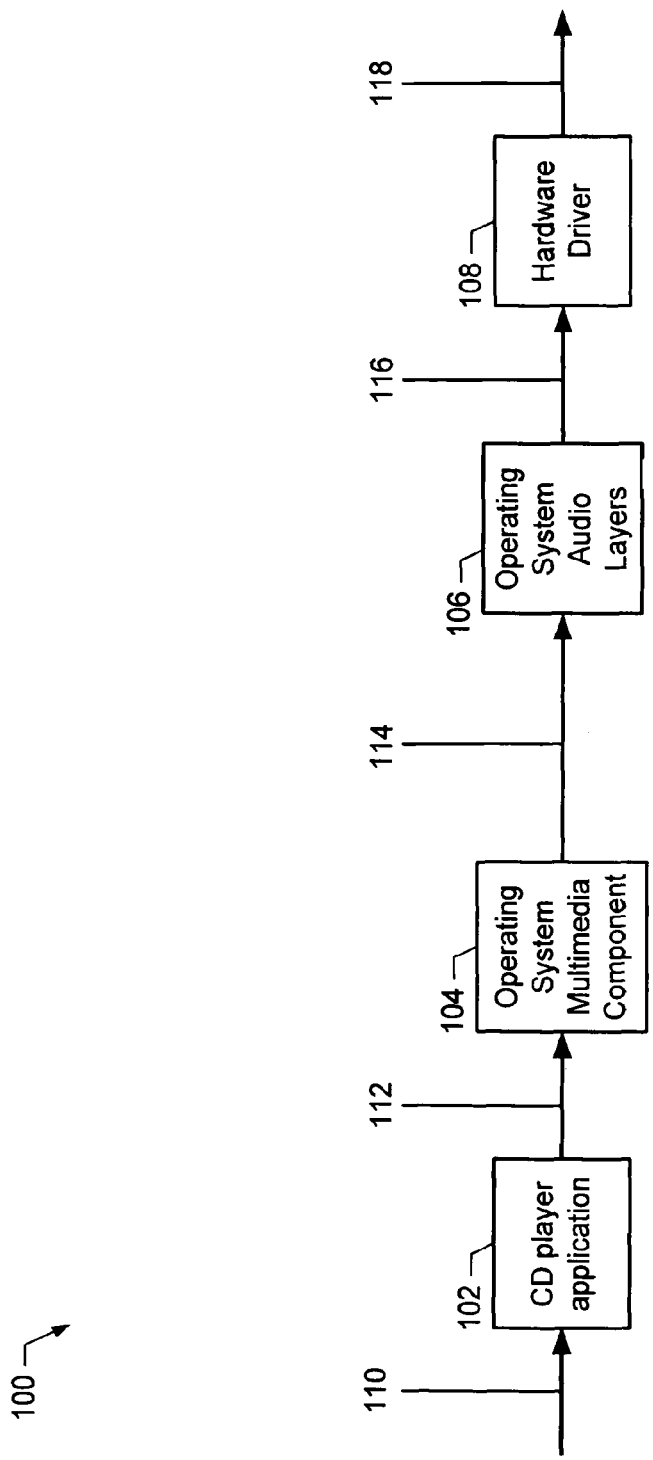
FIG. 1 is a block diagram of an example prior art system for audio playback on a computer system.

FIG. 1 a block diagram of an example prior art system 100 for CD audio playback on a computer system. The example prior art system 100 may be implemented as several components of hardware, each of which may be configured to perform one or more functions, may be implemented in software or firmware where one or more programs are used to perform the different functions, or may be a combination of hardware, firmware, and/or software. In this example, the example prior art system 100 includes a CD player application 102, an operating system (OS) multimedia component 104, OS audio layers 106, a hardware driver 108, and audio data paths 110, 112, 114, 116, and 118.

The CD player application 102 may be any software application configured to receive CD audio data from a CD drive 620 (FIG. 6) and playback the audio data. The CD player application 102 may convert the CD audio data to pulse code modulated (PCM) data. An example CD player application 102 is Windows Media Player™. The Windows Media Player™ is configured to receive CD audio data, as well as other audio formats such as MP3 and/or MPG, and playback the audio data.

The OS multimedia component 104 is configured to receive the PCM data from the CD player application 102 and also provides the interface between the CD player application 102 and the OS audio layers 106. The OS multimedia component 104 may be a plurality of software instructions used to, but not limited to, transfer digital audio data to audio buffers and/or audio stacks within the OS and/or scale the gain applied to the audio data.

The OS audio layers 106 are configured to process audio sources, including the PCM data, system sounds, and/or sounds generated by other applications. The OS audio layers 106 may process audio sources (e.g., audio streams) by mixing audio sources together, filtering the audio sources, and/or conveying the audio sources to the hardware driver 108. A person of ordinary skill in the art will readily appreciate that the OS audio layers 106 are not limited to the above-described functionality.

The audio data paths 110, 112, 114, 116, and 118 are used to convey the digital audio data or audio streams to the blocks of the example prior art system 100. The audio data paths 110, 112, 114, 116, and 118 may be any combination of an input/output bus, a data bus, a wire, a cable, a memory location, or any other device used to transport data. The audio data paths 110, 112, 114, 116, and 118 are example points at which copyrighted audio content is vulnerable to copying, either in a digital form or an analog form. For example, a software application may attempt to access the data directly from the CD drive 620 or a software application may intercept the PCM data from the CD player application 102. A person of ordinary skill in the art will readily appreciate that there are additional points at which the copyrighted audio content may be copied and that the audio data paths 110, 112, 114, 116, and 118 are merely example points.

Figure 2:
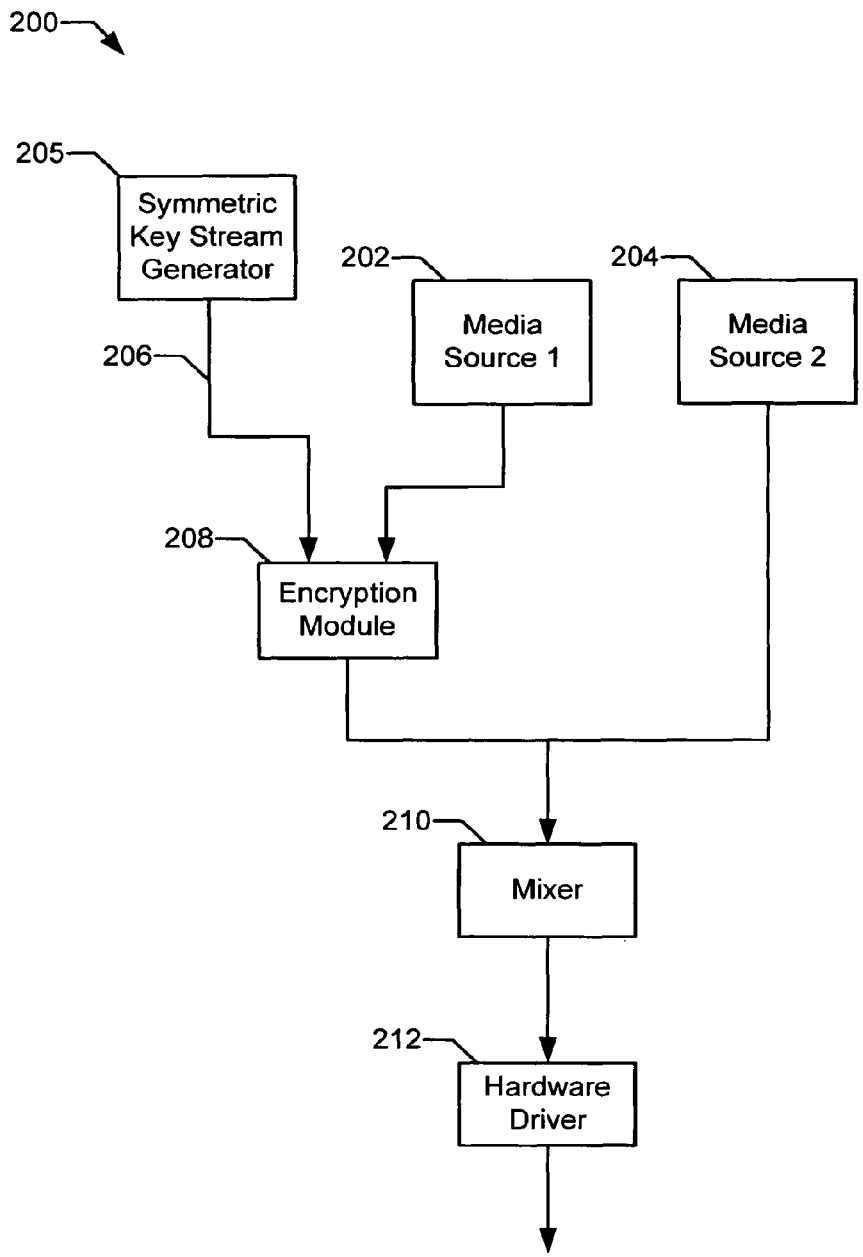
FIG. 2 is a block diagram of an example system for mixing encrypted data with unencrypted data.

FIG. 2 is a block diagram of an example system 200 for mixing encrypted data with unencrypted data. The example system 200 may be implemented as several components of hardware, each of which is configured to perform one or more functions, may be implemented in software where one or more software and/or firmware programs are used to perform the different functions, or may be a combination of hardware and software. In this example, the system 200 includes a first media source 202, a second media source 204, a symmetric key stream generator 205, a symmetric key stream 206, an encryption module 208, a mixer 210, and a hardware driver 212.

The first media source 202 may provide an unencrypted audio source including a stream of digital data samples. Each digital data sample has a predetermined size (e.g., a number or a maximum number of bits used to represent the sample). Example digital data samples include 8 bits, 16 bits, 20 bits, and 24 bits. The first media source 202 may provide, but is not limited to providing, audio content from a CD and/or digital versatile disc audio (DVD-A). In addition, the first media source 202 may provide copyrighted digital media but is not restricted to providing copyrighted digital media. In one example, the first media source 202 provides digital content in a raw digital format and/or digital content in the form of a PCM signal.

The second media source 204 may be configured to provide digital audio content in a manner similar to that of the first media source 202. The second media source 204 also includes a stream of unencrypted digital data samples where each sample has the same size or data width as a sample from the first media source 202. An example second media source 204 is a sound generated by an operating system (e.g., a tone) to indicate an error and/or sounds generated by a software application that is not concerned about protecting its audio content from copying.

The symmetric key stream generator 205 is configured to generate the symmetric key stream 206. The symmetric key stream generator 205 may use a key stream block ciper algorithm to generate the symmetric key stream 206. The key stream block cipher algorithm is well known to those of ordinary skill in the art and, thus, is not described in greater detail. The symmetric key stream generator 205 may use an encryption key known by the encryption module 208 and the hardware driver 212 to generate the symmetric key stream 206. Each key in the symmetric key stream 206 is of the same size or data width as the digital data samples associated with the first and second media sources 202 and 204. An example symmetric key stream 206 is a key stream produced by the symmetric key stream generator 205 using the well-known RC4 stream cipher algorithm. A person of ordinary skill in the art will readily appreciate that there are various other methods that may be used to generate the symmetric key stream 206.

The encryption module 208 is configured to receive unencrypted digital data from the first media source 202 and a symmetric key stream 206 and to encrypt the digital data (e.g., digital audio data) received from the first media source 202 using any known symmetric key stream encryption algorithm such as Triple Data Encryption Standard (DES). Symmetric key stream encryption algorithms are well known to those of ordinary skill in the art and, thus, are not described in further detail. In addition to encrypting digital data from the first media source 202, the encryption module 208 may also be configured to separate the encrypted data into at least two encrypted data streams or sources. If so, the encrypted data stream is separated so that the sum of the encrypted data streams (e.g., encrypted audio streams) is equal to the digital data stream provided by the encrypted digital content received from the first media source 202. The encryption module 208 may also be further configured to determine the least significant bit (LSB) of data provided by a media source such as, for example, an audio source.

The mixer 210 is configured to receive data from at least one encrypted media source (e.g., encrypted audio data) and an unencrypted media source (e.g., unencrypted audio data) and combine the data received from the media sources into a mixed media data stream. The mixer 210 is configured to combine the encrypted data (e.g., audio data) with unencrypted data (e.g., audio data) without knowledge of the encryption key used by the encryption module 208. The mixer 210 may combine the encrypted and the unencrypted data by calculating an average or by combining the data using some other statistical or mathematical method. In addition, the mixer 210 may also be configured to determine the LSB of data received from a media source, such as data received from the unencrypted media source 204.

The hardware driver 212 is configured to receive the mixed media data stream and decrypt the mixed media data stream using the encryption key used by the encryption module 208. The hardware driver 212 may decrypt the mixed media data stream (e.g., mixed audio) using a decryption algorithm that is complimentary to the encryption algorithm used by the encryption module 208 or may use some other decryption algorithm that is compatible with the encryption algorithm employed by the encryption module 208. The hardware driver 212 may also be configured to process the decrypted data by normalizing the decrypted data and/or correcting overflow of the decrypted data. The decrypted data (e.g., mixed audio data) is transmitted to the hardware associated with one or both of the media sources 202 and 204. Example hardware associated with one or both of the media sources 202 and 204 includes a soundcard or a device configured to generate sounds.

Figure 3:
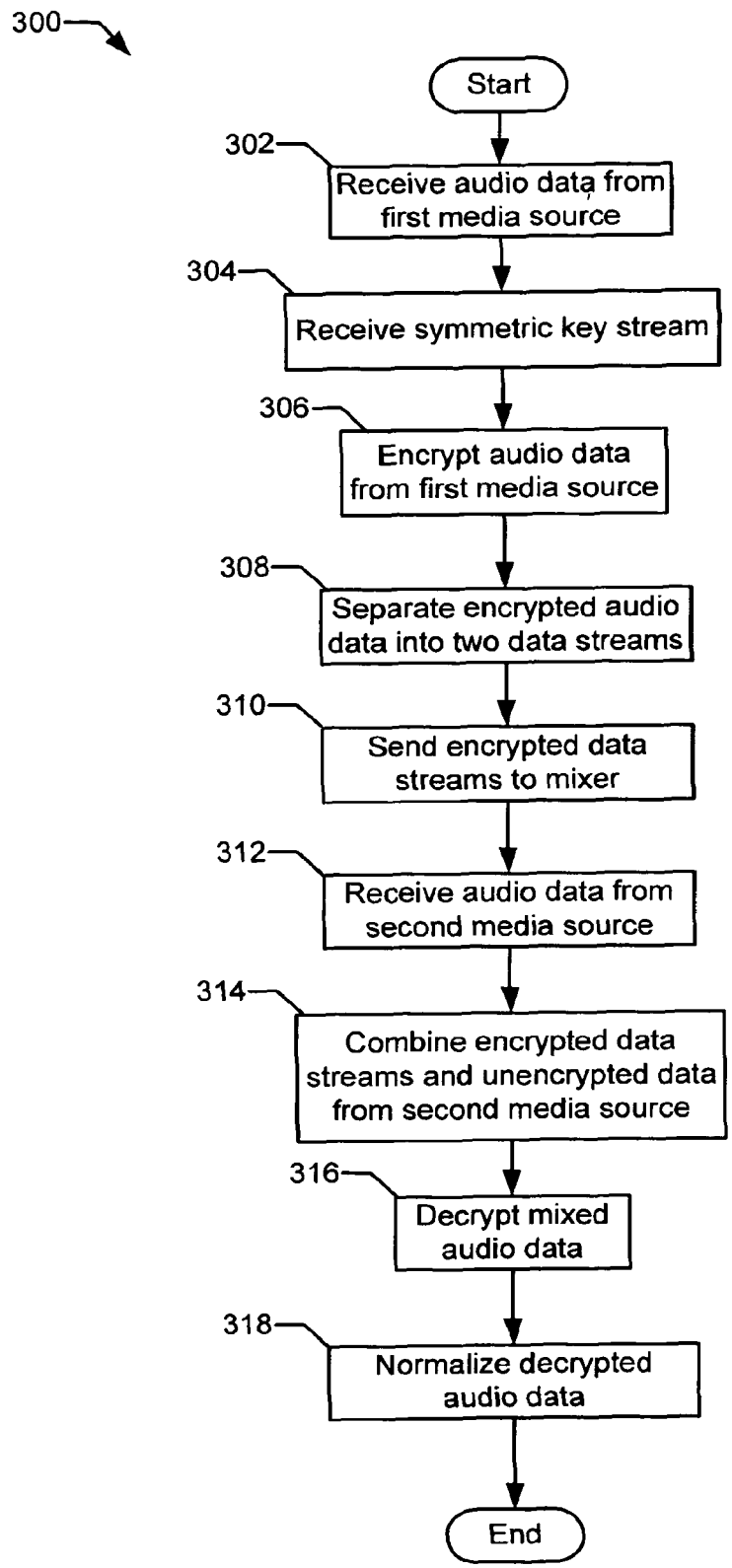
FIG. 3 is a flowchart depicting an example manner in which the system of FIG. 2 may be configured to mix encrypted audio data with unencrypted audio data.
Figure 4:
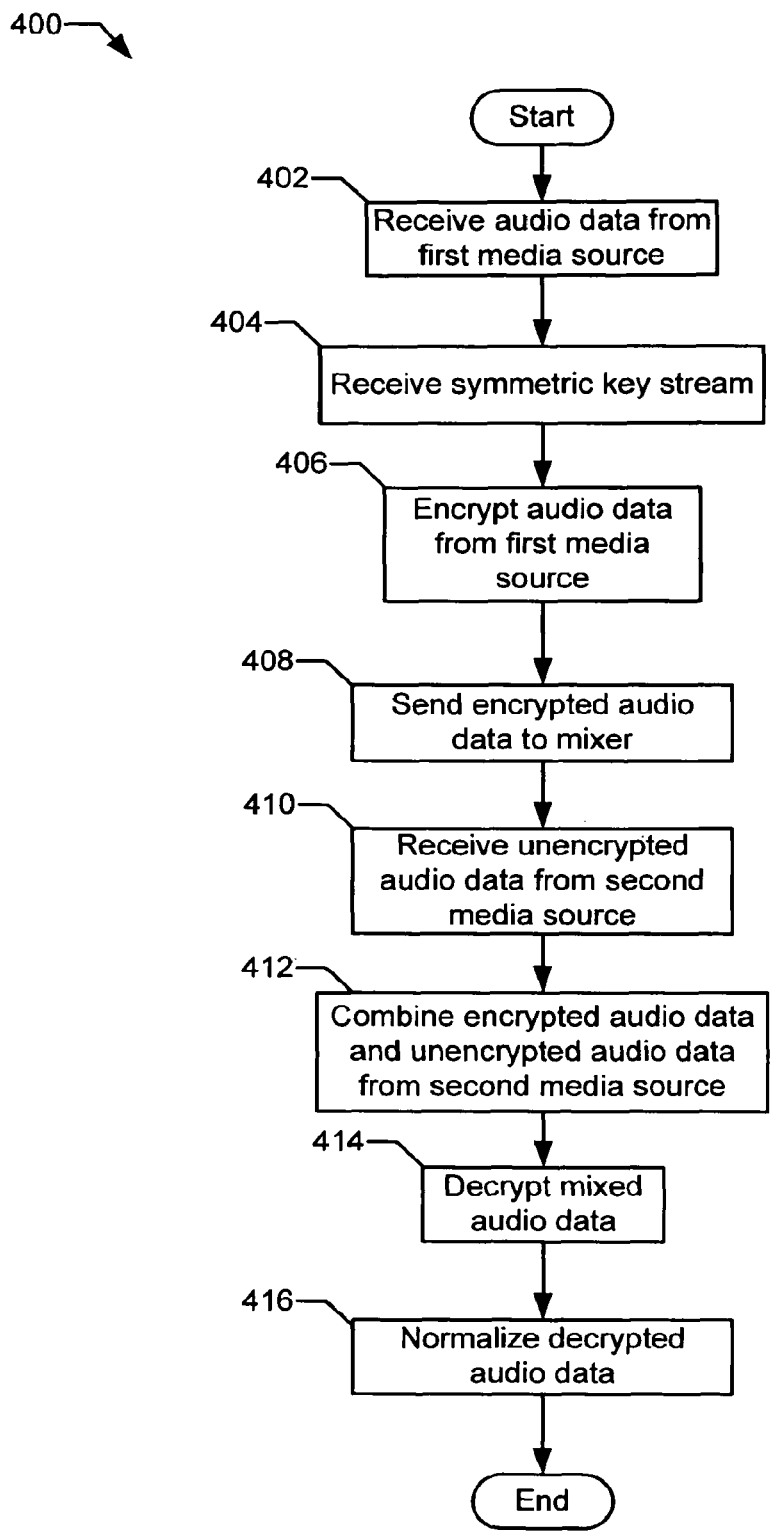
FIG. 4 is a flowchart depicting a second example manner in which the system of FIG. 2 may be configured to mix encrypted audio data with unencrypted audio data.
Figure 5:
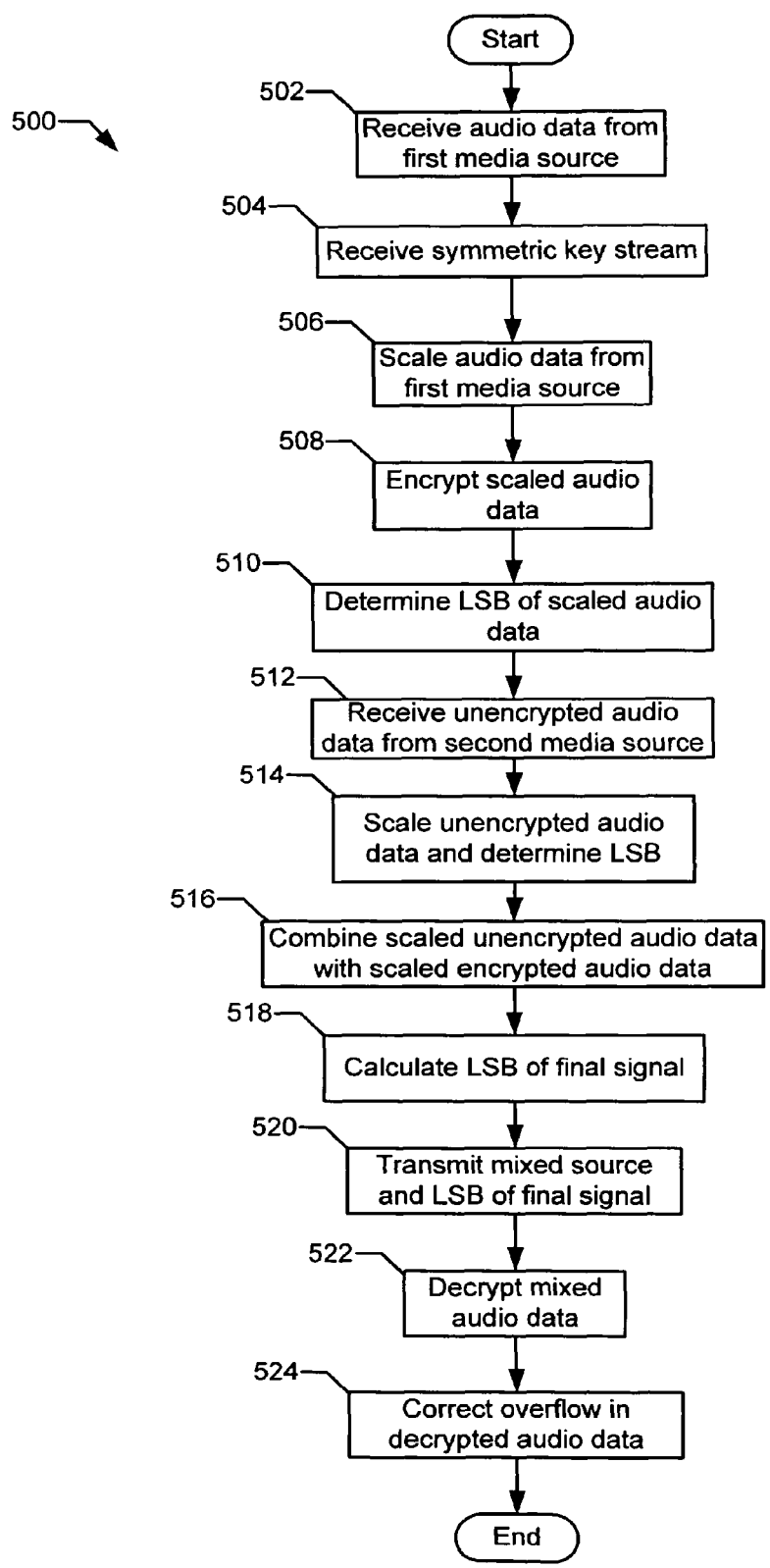
FIG. 5 is a flowchart depicting a third example manner in which the system of FIG. 2 may be configured to mix encrypted audio data with unencrypted audio data.

FIGS. 3-5 are flowcharts depicting an example manner in which the system of FIG. 2 may be configured to mix encrypted data with unencrypted data. Preferably, the illustrated processes 300, 400, and/or 500 are embodied in one or more software programs which are stored in one or more memories (e.g., the flash memory 612 and/or the hard disk 620) and executed by one or more processors (e.g., the processor 606) in a well-known manner. However, some or all of the blocks of the processes 300, 400, and/or 500 may be performed manually and/or by some other device. Although the processes 300, 400, and/or 500 are described with reference to the flowcharts illustrated in FIGS. 3-5, a person of ordinary skill in the art will readily appreciate that many other methods of performing the processes 300, 400, and/or 500 may be used. For example, the order of the blocks may be altered, the operation of one or more blocks may be changed, blocks may be combined, and/or blocks may be eliminated.

In general, the example process 300 receives data from the first media source 202 and the symmetric key stream 206. The encryption module 208 is configured to encrypt the data from the first media source 202 using the symmetric key stream 206 and to separate the encrypted data into a plurality (e.g., two) of encrypted data streams. The encrypted media data is separated so that the sum of the data from the encrypted data streams is equal to the encrypted data from the first media source 202. The encrypted data is transmitted to the mixer 210, which also receives unencrypted data from the second media source 204. The mixer 210 combines the encrypted data with the unencrypted data and transmits the mixed data to a hardware driver 212. The hardware driver 212 decrypts the mixed data and outputs the decrypted data (e.g., audio data) to a soundcard or other similar device.

Now turning in detail to FIG. 3, the example process 300 begins when the encryption module 208 receives audio data from the first media source 202 (block 302). For ease of discussion, the audio data received from the first media source 202 may be represented as a=a1, a2, a3 . . . , where a is associated with the first media source 202 and a1, a2, and a3 represent the first, second and third samples or data items received from the first media source 202, respectively. Each sample is n bits wide (e.g., has a size of n). The first media source 202 may provide a DVD-A audio stream from an audio player application or may be any type of unencrypted data stream as described above. The first media source 202 may contain copyrighted audio data.

The encryption module 208 also receives a symmetric key stream 206 from the symmetric key stream generator 205 (block 304). For ease of discussion, the symmetric key stream 206 is represented as k=k1, k2, k3 . . . , where k is the symmetric key stream 206 and k1, k2, and k3 represent the first, second, and third keys in the symmetric key stream 206, respectively. Each key in the symmetric key stream 206 is the same size (i.e., has the same width or number of bits) as the samples or data received from the first media source 202 (e.g., n bits). The symmetric key stream generator 205 may generate the symmetric key stream 206 using a key stream block cipher algorithm. Example key stream cipher algorithms are well known to those of ordinary skill in the art.

The encryption module 208 uses the symmetric key stream 206 to encrypt the audio data from the first media source 202 to form an encrypted audio data stream e (block 306). The encrypted audio data stream e may be represented as e=e1, e2, e3 . . . , where e1, e2, and e3 represent the first, second, and third samples or data portions associated with the encrypted audio data stream e, respectively. An example implementation of the encryption algorithm used at block 306 may be similar to Equation 1 shown below.

$$e1=a1+k1, e2=a2+k2, \qquad \text{Equation 1}$$

As shown above in Equation 1, a sample of the encrypted audio data stream e (e.g., e1) is calculated or determined by adding a sample of the audio data from the first media source 202 (e.g., a1) and a key from the symmetric key stream 206 (e.g., k1). A person of ordinary skill in the art will readily appreciate that the encryption process is not limited to Equation 1 and, thus, Equation 1 is merely an example.

After the audio data from the first media source 202 has been encrypted (block 306), the encryption module 208 separates the encrypted audio data stream e, into an encrypted data stream x and an encrypted data stream y (block 308). The encrypted audio data stream e may be separated into the encrypted data stream x and the encrypted data stream y so that each sample of the two encrypted data streams x and y is equal to half the corresponding sample of the encrypted audio data stream e (e.g., xi=yi=ei/2). The encrypted audio data stream e is separated into the two encrypted audio data streams x and y to facilitate prevention of data overflow during the example process 300.

The encrypted audio data streams x and y are transmitted to the mixer 210 (block 310). The mixer 210 also receives audio data from the second media source 204 (block 312). For ease of discussion, the audio data received from the second media source 204 will be represented as b=b1, b2, b3 . . . , where b is associated with the second media source 204 and b1, b2, and b3 represent the first, second and third samples or data portions received from the second media source 204, respectively. The samples or audio data received from the second media source 204, as well as the audio data received from the first media source 202 and the symmetric key stream 206, are n bits wide. The second media source 204 may provide unencrypted audio data associated with a system sound or some other sound that is generated by a software application.

After the encrypted audio data streams x and y and the unencrypted audio data from the second media source 204 are received by the mixer 210 (block 312), the mixer 210 combines the received audio data to form a mixed audio data stream m (block 314). The mixer 210 combines the received audio data without decrypting the encrypted audio data streams x and y and without knowledge of the encryption key used by the encryption module 208. The encrypted audio data streams x and y and the unencrypted audio data from the second media source 204 may be combined using Equation 2 shown below.

$$m1 = \frac{(x1+y1+b1)}{3}, m2 = \frac{(x2+y2+b2)}{3}, \ldots \qquad \text{Equation 2}$$

As shown above in Equation 2, a sample of the mixed audio data stream (e.g., m1) may be formed by calculating an average of data values from each of the two encrypted audio data streams x and y (e.g., x1 and y1) and audio data from the second media source 204 (e.g., b1). However, a person of ordinary skill in the art will readily appreciate that the manner in which the encrypted audio data associated with the data streams x and y may be mixed or combined with the unencrypted audio associated with the audio data (e.g., b1, b2, . . . ) from the second media source 204 is not limited to Equation 2.

After the mixed audio data stream m is formed (block 314), the mixed audio data stream m is transmitted to the hardware driver 212. The hardware driver 212 receives the mixed audio data stream m and decrypts the mixed audio data stream m to form a decrypted audio data stream s (block 316). The hardware driver 212 is aware of the encryption key used by the encryption module 208 and is configured to decrypt the mixed audio data stream m. An example method to decrypt the mixed audio data stream m is to use Equation 3 shown below.

$$s1 = m1 - \frac{k1}{3}, s2 = m2 - \frac{k2}{3}, \ldots \qquad \text{Equation 3}$$

As shown above in Equation 3, a sample of the decrypted audio data stream s (e.g., s1) may be formed by subtracting one third of the key value (e.g., $$\left(\text{e.g.,} \frac{k1}{3}\right)$$

from a sample of the mixed audio data stream m (e.g., m1).

After the decrypted audio data stream s is formed (block 316), the hardware driver 212 normalizes the decrypted audio data stream s to form a final signal f (block 318). An example method of normalizing the decrypted audio data stream s is illustrated in Equation 4 below.

$$f1 = s1 * \left(\frac{3}{2}\right) = \frac{a1 + b1}{2},$$
$$f2 = s2 * \left(\frac{3}{2}\right) = \frac{a2 + b2}{2}, \ldots \qquad \text{Equation 4}$$

As shown above in Equation 4, a sample of the final signal f (e.g., f1) is normalized by multiplying a sample of the decrypted audio data stream s (e.g., s1) by three-halves. This is equivalent to adding a sample or data from the first media source 202 (e.g., a1) and a sample or data from the second media source 204 (e.g., b1) and then dividing the sum by 2. The final signal f is then transmitted to hardware associated with the media source.

A second example process 400 by which the system of FIG. 2 may be configured to mix an encrypted audio data stream with an unencrypted audio data stream is shown in FIG. 4. The second example process 400 is similar to the example process 300 of FIG. 3.

Blocks 402 and 404 of the example process 400 of FIG. 4 are identical to blocks 302 and 304 of the example process 300 of FIG. 3. Similar to block 306 of FIG. 3, the encryption module 208 uses the symmetric key stream 206 to encrypt the audio data received from the first media source 202 to form the encrypted audio data stream e (block 406). However, in contrast to the example process 300 of FIG. 3, Equation 1 shown above is not used to encrypt the audio data from the first media source 202 (block 306) and the encrypted audio data stream e is not separated into encrypted audio data streams x and y (block 308). Instead, the audio data received from the first media source 202 may be encrypted using an equation similar to Equation 5 below (block 406).

$$e1 = \frac{a1 + k1}{2}, e2 = \frac{a2 + k2}{2}, \ldots \qquad \text{Equation 5}$$

Equation 5 as shown above is similar to Equation 1, but the samples or audio data from the first media source 202 (e.g., a1) and the keys from the symmetric key stream 206 (e.g., k) are divided by 2. A person of ordinary skill in the art will readily appreciate that other implementations exist and that Equation 5 is merely an example.

After the encrypted audio data stream e is formed (block 406), the encrypted audio data stream e is transmitted to the mixer 210 (block 408). The mixer 210 also receives unencrypted audio data from the second media source 204 (block 410) as described above. The mixer 210 mixes the encrypted audio data stream e and the audio data from the second media source 204 to form a mixed audio data stream m (block 412). As in the example process 300, the mixer 210 forms the mixed audio data stream m (block 412) without decrypting the encrypted audio data stream e and without knowledge of the encryption key used by the encryption module 208. The encrypted audio data stream e and the unencrypted audio from the second media source 204 may be combined or mixed by using Equation 6 shown below.

$$m1 = \frac{\left(e1 + \frac{b1}{2}\right)}{2}, m2 = \frac{\left(e2 + \frac{b2}{2}\right)}{2}, \ldots \qquad \text{Equation 6}$$

As shown above in Equation 6, a first sample of the mixed audio data stream (e.g., m1) is formed by calculating an average of the encrypted audio data stream e (e.g., e1) and a sample of the audio data from the second media source 204 divided by 2

$$\left(\text{e.g., } \frac{b1}{2}\right).$$

Of course, a person of ordinary skill in the art will readily appreciate that mixing the data streams associated with the media sources 202 and 204 is not limited to Equation 6 and that other implementations exist.

After the mixed audio data stream m is formed (block 412), the mixed audio data stream m is transmitted to a hardware driver 212. The hardware driver 212 receives the mixed audio data stream m and decrypts the mixed audio data stream m to form a decrypted audio data stream s (block 414). Similar to process 300, the hardware driver 212 is aware of the encryption key used by the encryption module 208 and is configured to decrypt the mixed audio data stream m. An example method to decrypt the mixed audio data stream m is to use Equation 7 shown below.

$$s1 = m1 - \frac{k1}{4}, s2 = m2 - \frac{k2}{4}, \ldots \qquad \text{Equation 7}$$

As shown above in Equation 7, the decryption process is similar to the decryption process in Equation 3. Instead of dividing the key value by 3 as in Equation 3 (e.g., $$\left(\text{e.g., } \frac{k1}{3}\right),$$

the key value is divided by 4 (e.g., $$\left(\text{e.g., } \frac{k1}{4}\right)$$

because the key value was divided by 2 in Equations 5 and 6.

After the decrypted audio data stream s is formed (block 414), the hardware driver 212 normalizes the decrypted audio data stream s to form a final signal f (block 416). An example method to normalize the decrypted audio data stream s is to use Equation 8 below.

$$f1 = s1 * 2 = \frac{a1 + b1}{2}, f2 = s2 * 2 = \frac{a2 + b2}{2}, \ldots \qquad \text{Equation 8}$$

As shown above in Equation 8, a sample of the final signal f (e.g., f1) is normalized by multiplying a sample of the decrypted audio data stream s (e.g., s1) by 2. This is equivalent to adding a sample or data from the first media source 202 (e.g., a1) and a sample or data from the second media source 204 (e.g., b1) and then dividing the sum by 2. The final signal f is transmitted to hardware associated with one or both of the audio data streams 202 and 204 as in the case with the example process 300.

A third example process 500 by which the system of FIG. 2 may be configured to mix encrypted audio with unencrypted audio is shown in FIG. 5. Blocks 502 and 504 of the example process 500 of FIG. 5 are identical to blocks 302 and 304 of the example process 300 of FIG. 3. The encryption module 208 may scale the audio data from the first media source 202 by dividing each sample or data from the first media source 202 by 2 to form a first scaled audio data stream a'

$$\left(\text{e.g., } a1' = \frac{a1}{2}, a2' = \frac{a2}{2}, \ldots \right)$$

(block 506). The first scaled audio data stream a' may be used to prevent overflow errors in the encryption process. The mixer 210 analyzes the first scaled audio data stream a' to find samples or data equal to a predetermined maximum value (e.g., $2^{n-1}-1$, where n is the bit depth or width of the sample) (block 506). If a sample is equal to the predetermined maximum value (e.g., $a1'=2^{n-1}-1$), the encryption module 208 may subtract a number from the sample, such as 1 (e.g., $a1'=a1'-1$), to prevent a sample from the first scaled audio data stream a' to facilitate the encryption process of Equation 9 below.

After the audio data received from the first media source 202 is scaled, the encryption module 208 uses the symmetric key stream 206 to encrypt the scaled audio data stream a1' to form the encrypted audio data stream e (block 508). However, Equation 1 shown above is not used to encrypt the audio data received from the first media source 202 (e.g., block 306) and the encrypted audio data stream e is not separated into encrypted audio data streams x and y (e.g., block 308). Instead, the audio data received from the first media source 202 may be encrypted using an equation similar to Equation 9 below (block 508).

$$e1=(a1'+k1)\bmod(2^{n-1}-1), e2=(a2'+k1)\bmod(2^{n-1}-1), \quad \text{Equation 9}$$

As shown above in Equation 9, a sample of the encrypted audio data stream e (e.g., e1) is calculated by adding a sample or data from the first scaled audio data stream a' (e.g., a1) and the key of the symmetric key stream 206 (e.g., k1) and performing a modulo operation with a divisor equal to $2^{n-1}-1$. The encrypted audio data stream e may also be scaled. For example, each sample may be scaled by 2 (e.g., e1=2*e1).

After the encrypted audio data stream e is generated (block 508), a least significant bit (LSB) of the each sample of the scaled audio data stream a' is determined (e.g., LSB(a1')) (block 510). A person of ordinary skill in the art will readily appreciate that there are many methods to determine the LSB of each sample of the scaled audio data stream a'. For example, a logical AND operation may be used to determine the value of the last bit of the sample (e.g., LSB(a1')=a1' AND 1). The encryption module 208 transmits the LSB of the first scaled audio data stream a' and the encrypted audio data stream e to the mixer 210.

The mixer 210 receives audio data from the second media source 204 (block 512). The mixer 210 scales the audio data received from the second media source 204 in a manner similar to the manner in which the encryption module 208 scaled the audio data received from the first media source 202 to form a second scaled audio data stream b' (e.g., $$\left(\text{e.g., } b1' = \frac{b1}{2}\right)$$

(block 514). The mixer 210 also computes the LSB of the samples of the second scaled audio data stream b' (block 514). The LSB of the second scaled audio data stream b' may be determined in a manner similar to the manner in which the encryption module 208 determines the LSB of the first scaled audio data stream a'.

After the audio data received from the second media source 204 is scaled and the LSB of the second scaled audio data stream b' is determined (block 514), the encrypted audio data stream e' and the second scaled audio data stream b' are combined (block 516). The encrypted audio data stream e' may be multiplied by a predetermined number before the encrypted audio data stream e' is combined with the second scaled audio data stream b' (block 516). For example, if the first scaled audio data stream a' was divided by 2 in block 506, the encrypted audio data stream e' is multiplied by 2 in block 516. The mixer 210 may combine the encrypted audio data stream e' with the second scaled audio data stream b' by using Equation 10 below or an equation similar to Equation 10.

$$m1=e1+b1', m2=e2+b2', \quad \text{Equation 10}$$

As shown above in Equation 10, a sample of the mixed audio data stream m (e.g., m1) is calculated by adding a sample of the encrypted audio data stream (e.g., e1) and a sample of the scaled second audio data stream (e.g., b1').

The mixer 210 then determines the LSB of the final signal f (block 518). The LSB of the final signal f may be determined by applying an XOR (exclusive OR) operation to each sample of the LSB of the first scaled audio data stream and the LSB of the second scaled audio data stream (e.g., LSB(a1') XOR LSB(b1')) (block 518). The mixed audio data stream m and the LSB of the final signal f are then transmitted to the hardware driver 212 (block 520).

The hardware driver 212 receives the mixed audio data stream m and the LSB of the final signal f (block 520). The hardware driver 212 decrypts the mixed audio data stream m to form the decrypted audio data stream s by using Equation 11 below.

$$s1=(m1'+k1)\bmod(2^{n-1}-1), s2=(m2'+k2)\bmod(2^{n-1}-1), \quad \text{Equation 11}$$

As shown above in Equation 11, a sample of the decrypted audio data stream s (e.g., s1) is calculated by subtracting a key from the symmetric key stream (e.g., k1) from the mixed audio data stream m (e.g., m1) and then applying a modulo operation using a divisor equal to $2^{n-1}-1$.

After the decrypted audio data stream s is generated, the hardware driver 212 corrects the decrypted audio data stream s for overflow errors to create the final signal f (block 524). Overflow errors in each sample of the final signal f may be corrected by using the determined LSB of the final signal f and the LSB of the decrypted audio data stream s. For example, if the LSB(s1) is equal to LSB(f1), then the sample of the final signal f is equal to the sample of the decrypted audio data stream s. Otherwise, the sample of the final signal f is equal to the sample of the decrypted audio data stream s added to the predetermined maximum value (e.g., $f1=s1+2^{n-1}-1$).

Figure 6:
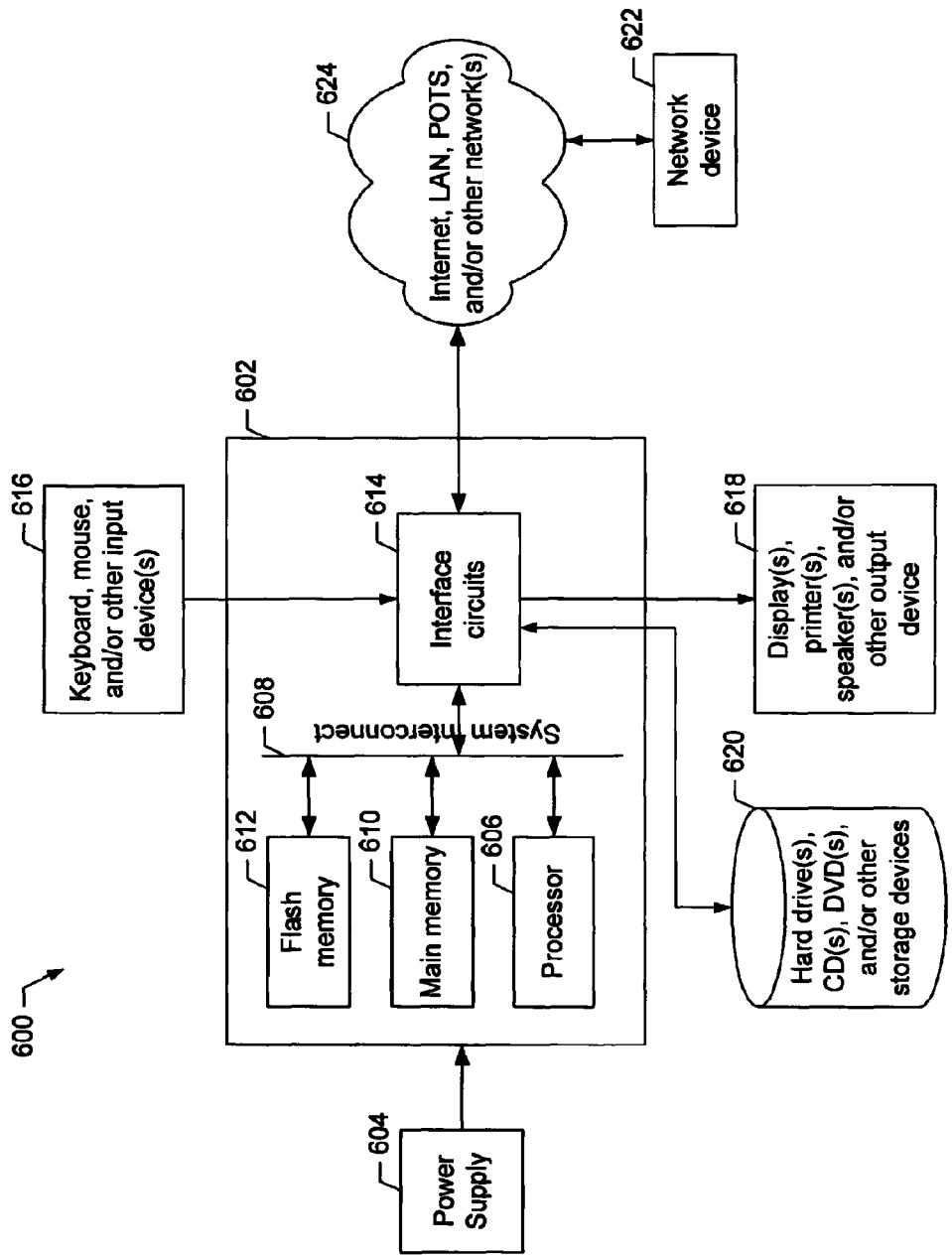
FIG. 6 is a block diagram of an example processor system that may be used to implement the example methods and apparatus disclosed herein

FIG. 6 is a block diagram of an example computer system illustrating an environment of use for the disclosed system. The computer system 600 may be a personal computer (PC) or any other computing device. In the example illustrated, the computer system 600 includes a main processing unit 602 powered by a power supply 604. The main processing unit 602 may include a processor 606 electrically coupled by a system interconnect 608 to a main memory device 610, a flash memory device 612, and one or more interface circuits 614. In an example, the system interconnect 608 is an address/data bus. Of course, a person of ordinary skill in the art will readily appreciate that interconnects other than busses may be used to connect the processor 606 to the other devices 610, 612, and/or 614. For example, one or more dedicated lines and/or a crossbar may be used to connect the processor 606 to the other devices 610, 612, and/or 614.

The processor 606 may be any type of processor, such as a processor from the Intel Pentium® family of microprocessors, the Intel Itanium® family of microprocessors, the Intel Centrino® family of microprocessors, and/or the Intel XScale® family of microprocessors. In addition, the processor 606 may include any type of cache memory, such as static random access memory (SRAM). The main memory device 610 may include dynamic random access memory (DRAM) and/or any other form of random access memory. For example, the main memory device 610 may include double data rate random access memory (DDRAM). The main memory device 610 may also include non-volatile memory. In an example, the main memory device 610 stores a software program which is executed by the processor 606. The flash memory device 612 may be any type of flash memory device. The flash memory device 612 may store firmware used to boot the computer system 600.

The interface circuit(s) 614 may be implemented using any type of interface standard, such as an Ethernet interface and/or a Universal Serial Bus (USB) interface. One or more input devices 616 may be connected to the interface circuits 614 for entering data and commands into the main processing unit 602. For example, an input device 616 may be a keyboard, mouse, touch screen, track pad, track ball, isopoint, and/or a voice recognition system.

One or more displays, printers, speakers, and/or other output devices 618 may also be connected to the main processing unit 602 via one or more of the interface circuits 614. The display 618 may be a cathode ray tube (CRT), a liquid crystal display (LCD), or any other type of display. The display 618 may generate visual indications of data generated during operation of the main processing unit 602. The visual indications may include prompts for human operator input, calculated values, detected data, etc.

The computer system 600 may also include one or more storage devices 620. For example, the computer system 600 may include one or more hard drives, a compact disk (CD) drive, a digital versatile disk drive (DVD), and/or other computer audio input/output (I/O) devices. In addition to the text strings stored in the flash memory device 612 (if any), one or more storage devices 620 (e.g., a hard disk) may store text strings in one or more languages.

The computer system 600 may also exchange data with other devices 622 via a connection to a network 624. The network connection may be any type of network connection, such as an Ethernet connection, digital subscriber line (DSL), telephone line, coaxial cable, etc. The network 624 may be any type of network, such as the Internet, a telephone network, a cable network, and/or a wireless network. The network devices 622 may be any type of network devices 622. For example, the network device 622 may be a client, a server, a hard drive, etc.

Although the above discloses example systems including, among other components, software executed on hardware, it should be noted that such systems are merely illustrative and should not be considered as limiting. For example, it is contemplated that any or all of the disclosed hardware and software components could be embodied exclusively in dedicated hardware, exclusively in software, exclusively in firmware or in some combination of hardware, firmware and/or software.

In addition, although certain methods, apparatus, and articles of manufacture have been described herein, the scope of coverage, of this patent is not limited thereto. On the contrary, this patent covers all apparatus, methods and articles of manufacture fairly falling within the scope of the appended claims either literally or under the doctrine of equivalents.

The invention claimed is:

1. A method comprising:
   scaling audio from a first media source based on a scaling factor to generate a first scaled audio data stream;
   identifying sample values of the first scaled audio data stream equal to a target value associated with a sample bit depth;
   encrypting the first scaled audio stream based on the target value and a symmetric key stream to generate an encrypted data stream; and
   mixing scaled audio from a second media source with the encrypted data stream to generate a mixed audio data stream.

2. A method as described in claim 1, wherein the target value is a maximum based on the bit depth associated with each sample value.

3. A method as described in claim 1, wherein encrypting further comprises performing a modulo operation with the target value.

4. A method as described in claim 1, wherein encrypting further comprises performing a modulo operation with a divisor equal to the target value.

5. A method as described in claim 1, further comprising identifying a least significant bit (LSB) of the first scaled audio data stream in response to encrypting the first scaled audio stream.

6. A method as described in claim 5, further comprising correcting overflow errors based on the LSB of the first scaled audio data stream.

7. An apparatus comprising:
   an encryption module to scale audio from a first media source based on a scaling factor, the encryption module to generate a first scaled audio data stream, to identify sample values of the first scaled audio data stream equal to a target value associated with a sample bit depth, and to encrypt the first scaled audio stream based on the target value and a symmetric key stream to generate an encrypted data stream; and
   a mixer to mix scaled audio from a second media source with the encrypted data stream to generate a mixed audio data stream, at least one of the encryption module or the mixer comprising a processor.

8. An apparatus as described in claim 7, wherein the encryption module is to perform a modulo operation with the target value.

9. An apparatus as described in claim 7, wherein the encryption module is to perform a modulo operation with a divisor equal to the target value.

10. An apparatus as described in claim 7, wherein the encryption module is to identify a least significant bit (LSB) of the first scaled audio data stream in response to encrypting the first scaled audio stream.

11. An apparatus as described in claim 10, wherein the mixer is to correct overflow errors based on the LSB of the first scaled audio data stream.

12. A machine readable storage medium, excluding propagating signals, comprising instructions stored thereon that, when executed, cause a machine to at least:
- scale audio from a first media source based on a scaling factor to generate a first scaled audio data stream;
- identify sample values of the first scaled audio data stream equal to a target value associated with a sample bit depth;
- encrypt the first scaled audio stream based on the target value and a symmetric key stream to generate an encrypted data stream; and
- mix scaled audio from a second media source with the encrypted data stream to generate a mixed audio data stream.

13. A machine readable storage medium as described in claim 12 having instructions stored thereon that, when executed, cause a machine to perform a modulo operation with the target value to encrypt the first scaled audio stream.

14. A machine readable storage medium as described in claim 12 having instructions stored thereon that, when executed, cause a machine to perform a modulo operation with a divisor equal to the target value to encrypt the first scaled audio stream.

15. A machine readable storage medium as described in claim 12 having instructions stored thereon that, when executed, cause a machine to identify a least significant bit (LSB) of the first scaled audio data stream in response to encrypting the first scaled audio stream.

16. A machine readable storage medium as described in claim 12 having instructions stored thereon that, when executed, cause a machine to correct overflow errors based on the LSB of the first scaled audio data stream.

17. A machine readable storage medium as described in claim 12 having instructions stored thereon that, when executed, cause a machine to combine the encrypted data stream with the scaled audio from the second media source without decrypting each of a plurality of samples from the encrypted data stream.

* * * * *